(12) United States Patent
In De Betou et al.

(10) Patent No.: US 9,066,164 B2
(45) Date of Patent: Jun. 23, 2015

(54) OVERHEAD ADJUSTMENT SCHEME FOR PASSIVE OPTICAL NETWORKS

(75) Inventors: Einar In De Betou, Vallingby (SE);
Stefan Dahlfort, Santa Clara, CA (US);
Peter Ohlen, Stockholm (SE)

(73) Assignee: TELEFONAKTIEBOLAGET LM ERISSON (PUBL), Stockholm (SE)

( * ) Notice: Subject to any disclaimer, the term of this patent is extended or adjusted under 35 U.S.C. 154(b) by 619 days.

(21) Appl. No.: 13/510,056

(22) PCT Filed: Nov. 18, 2009

(86) PCT No.: PCT/SE2009/051303
§ 371 (c)(1),
(2), (4) Date: May 16, 2012

(87) PCT Pub. No.: WO2011/062528
PCT Pub. Date: May 26, 2011

(65) Prior Publication Data
US 2012/0230678 A1    Sep. 13, 2012

(51) Int. Cl.
*H04B 10/08* (2006.01)
*H04Q 11/00* (2006.01)
*H04L 7/04* (2006.01)

(52) U.S. Cl.
CPC ............ *H04Q 11/0067* (2013.01); *H04L 7/041* (2013.01); *H04Q 2011/0064* (2013.01); *H04Q 2011/0083* (2013.01)

(58) Field of Classification Search
CPC .................. H04Q 11/0066; H04Q 2011/0064; H04Q 2011/0083; H04J 3/1694; H04J 3/1682; H04B 10/272; H04B 7/2121
USPC ..................... 398/25, 27, 58, 66–71
See application file for complete search history.

(56) References Cited

U.S. PATENT DOCUMENTS

| | | | |
|---|---|---|---|
| 6,539,205 B1* | 3/2003 | Wan et al. ...................... | 370/465 |
| 7,930,616 B2* | 4/2011 | Gerstel et al. ................. | 714/776 |
| 8,041,216 B2* | 10/2011 | de Lind van Wijngaarden ................... | 398/71 |
| 8,102,851 B1* | 1/2012 | Mandin et al. ................ | 370/390 |
| 8,630,544 B2* | 1/2014 | de Lind van Wijngaarden ................... | 398/70 |
| 8,798,461 B2* | 8/2014 | de Lind van Wijngaarden ................... | 398/25 |
| 8,897,639 B2* | 11/2014 | Trojer et al. .................... | 398/38 |
| 8,930,616 B2* | 1/2015 | Blake et al. .................... | 711/106 |
| 2003/0103476 A1* | 6/2003 | Choi et al. ..................... | 370/329 |
| 2004/0141759 A1* | 7/2004 | Stiscia et al. .................. | 398/168 |
| 2009/0202245 A1* | 8/2009 | Bouda ............................ | 398/76 |
| 2012/0128358 A1* | 5/2012 | Zhang et al. ................... | 398/63 |
| 2012/0275792 A1* | 11/2012 | Nandiraju et al. ............. | 398/66 |

FOREIGN PATENT DOCUMENTS

| | | | |
|---|---|---|---|
| EP | 1793514 A1 | 6/2007 | |
| EP | 1845671 A2 | 10/2007 | |
| EP | 2088707 A1 | 8/2009 | |

* cited by examiner

*Primary Examiner* — Daniel Washburn
*Assistant Examiner* — Hibret Woldekidan

(57) ABSTRACT

Embodiments of the present invention relate system and method for handling large dynamical signals in a passive optical network system and in particular for determining scheduling of bursts from a plurality of optical network units. More particularly, embodiments of the present invention relate to a system and method for determining a bit error ratio, i.e. BER in received communication data, determining, using the BER, optimized transmission scheduling of communication bursts from the optical network units, and providing a signal to the optical network units indicating the transmission scheduling of transmission bursts in accordance with the determined optimized transmission scheduling.

9 Claims, 4 Drawing Sheets

OVERHEAD ADJUSTMENT SCHEME FOR PASSIVE OPTICAL NETWORKS

TECHNICAL FIELD

The present invention relates to a solution for handling large dynamical signals in a passive optical network system and in particular for determining scheduling of bursts from a plurality of optical network units.

BACKGROUND

A Passive Optical Network (PON) is a communication system where data is transmitted bi-directionally over a fiber infrastructure, the Optical Distribution Network (ODN) in a point-to-multi-point configuration. It consists of an Optical Line Termination (OLT), which resides in a Central Office (CO). The OLT services a number of Optical Network Units (ONU) or Optical Network Terminations (ONT) residing at (or close to the) premises of the end users, typically connected in a star arrangement using optical power splitters. Since the physical medium is shared, the ONU's are scheduled by the OLT to transmit in the upstream direction in a Time Division Multiple Access (TDMA) manner.

PON systems allow for flexibility in the geographical area coverage of the ODN. This leads to large differences in the attenuation of the optical signal, when arriving at the receiver in the OLT, for different ONU's. The OLT receiver is therefore required to handle a large dynamic range of optical input powers—typically 10-25 dB.

Transmissions from different ONU's are made in fairly short bursts which make it important at the OLT side to adapt to input power variations quickly.

The geographical distance difference of different ONUs also means that there will be a difference in phase of the burst signals arriving at the OLT. After detection in the optical receiver at the OLT, the signal needs to be phase aligned to the local system clock at the OLT. This is done by a Clock- and Data Recovery (CDR) device.

The goal of this process is to find an ideal threshold for detection and an optimal point in time to sample each data bit. The device or devices involved in this process is usually referred to as burst-mode receiver (BMR), but other names exist.

FIG. 2 outlines the overhead fields in the burst transmission that aids the burst-mode receiver to achieve an optimal threshold and sampling point;

Guard time: This is a time slot when the "previous burst" transmitter turns off its laser and the "current burst" transmitter turns off its laser Preamble: This is a training pattern that the burst-mode receiver uses to decide optimal threshold and sampling point Delimiter: This field is used for achieving byte or word synchronization in the receiver.

The length of the overhead needs to be a trade-off between performance and protocol efficiency. Too long overhead leads to a penalty in protocol efficiency and less capacity is available to transfer real payload data.

To make the optical receiver able to quickly adapt to optical input powers varying as much as 10-25 dB, some sort of adaptive circuitry is necessary. The adaptive circuitry is sometimes termed "automatic gain control" or "adaptive threshold detection" but other variants exist. The adaptation process is normally helped by letting the ONU send out a training pattern, usually referred to as preamble, before the actual data transmission begins. The receiver can then adjust itself to be prepared for the actual data reception. The adaptive circuitry has an associated time constant which reflects the time it takes for the receiver to respond to a change in input amplitude. Normally, this time constant is longer when the difference in input amplitude, or dynamic range, is larger.

The burst-mode CDR process also associated with a time constant. This time constant depend heavily on the implementation. Normally, the burst-mode CDR process uses the preamble to decide where the optimal sampling point is.

The time it takes for both the optical receiver to adjust the threshold to the incoming burst signal and the time it takes for the burst-mode CDR to find the optimal sampling point to meet a specific target bit error ratio could be referred to as the optimal burst overhead time. The optimal burst overhead time for a given burst transmission, for a given optical receiver and for a given burst-mode CDR architecture is mainly decided by the parameters of the preceding burst.

Along the path from the transmitter at the ONU side to the receiver at the OLT side, one or several amplifiers (optical or O/E/O) may be placed to increase the total link budget and thus increase the reach of the system. This is often referred to as "long reach" PON or extended reach PON, but other names exist. These amplifiers may show transient behavior at the start of a burst transmission. Part of the preamble could be used to let these transient behaviors fade out.

For some existing burst-mode receiver implementations, the process of adapting to a new burst is helped by letting a device that knows about the timing of the upstream transmission provide a reset signal to the burst-mode receiver. The use of such reset signal may help to achieve fast adaptation times. However, it is not always the case that there is a device that easily can provide an accurate reset signal to the burst-mode receiver. One example of such case is a long-reach PON architecture where the burst-mode receiver is located outside the OLT main cabinet. Even though such a reset signal might be derived, at a certain cost of complexity, the adaptation time may still be a function of the difference in input amplitude between different bursts. In that case, it might still be beneficial to find an optimal overhead length. Also, when optical amplifiers are used, they may not be able to take advantage of a reset signal.

An existing solution to the problem of finding an optimal burst overhead is to adjust the preamble time based on the expected difference in received power from different ONUS, based on power measurements, as described in EP1793514. One drawback with this solution is that it requires signal strength measurement capabilities of the optical receiver, which requires external control signals to the receiver which adds to its complexity. in another solution, as described in EP1791275, the receiver is adjusted to the expected power level prior to the reception of the burst. This also requires external control signals to the receiver which adds to its complexity. A common problem with both these solutions is that, in a scenario when certain types of reach extenders is employed to increase the reach of the PON system (e.g. mid-span optical amplifiers), signal strength measurements may be difficult or costly to implement.

Another problem with these solutions is that they only focus on received signal power and does not take other link parameters into account; for example, transient signal degradation caused by a mid-span optical amplifier at the start of a burst.

SUMMARY

It is thus an object of the present invention to address some of the problems discussed above. This is solved in the present invention by making use of bit error ratio (BER) measurements to find an optimal overhead length preceding each burst. To maximize the efficiency of the link, the overhead length should be kept as short as possible to avoid wasting unnecessary bandwidth. The optimal length of the overhead for a burst is dependent on from which ONU the previous burst was transmitted. It is therefore possible to measure BER as a function of overhead length for a combination of previous burst ONU—current burst ONU to find an optimal preamble length which stills guarantees a certain target BER. By using this optimal preamble prior to every burst transmission, it is guaranteed that the efficiency of the link is maximized, in terms of protocol overhead (in other words: capacity), while still meeting a target BER for the system.

The present invention is implemented in a number of exemplified embodiments, in which a first is an optical receiver in a passive optical network. The receiver comprises a processing unit, a memory unit, an optical communication interface. The processing unit may be arranged to execute instruction sets stored in the memory unit, to receive communication data on the optical communication interface from a plurality of optical network units. The processing unit may be further arranged to determine a bit error ratio, i.e. BER in received communication data, determine, using the BER, optimized transmission scheduling of communication bursts from the optical network units, and provide a signal to the optical network units indicating the transmission scheduling and overhead parameters of transmission bursts in accordance with the determined optimized transmission scheduling.

The optimized transmission scheduling may for instance comprise adjusting overhead length of transmission burst, which may be adjusted by adjusting at least one of guard time and preamble length. The optimized transmission scheduling may comprise adjusting transmission order of communication data from the optical network units. Also the optimized transmission scheduling may comprise a combination of overhead length adjustment and transmission order adjustment.

The BER may be determined for instance by analyzing a pre defined data field transmitted from the optical network unit or by analyzing frames related to forward error correction.

The processing unit may be further arranged to continuously execute scheduling optimization in order to accommodate changes of at least one of network configuration and network transmission quality. The processing unit may also be arranged to take geographical information of ONUs into account when determining the optimized transmission scheduling.

Another aspect of the present invention is provided, a method in an optical line termination device in a passive optical network. The method is arranged to control transmission bursts from a plurality of optical network units. The method comprising the steps of receiving communication data from the optical network units, determining bit error ratio of the received communication data, determining, using the bit error ratio, optimized transmission scheduling of communication burst from optical network units, and providing a control signal to the optical network units indicating scheduling and overhead parameters of transmission burst from the optical network units in accordance with the optimized transmission scheduling.

Yet another aspect of the present invention is provided, an optical transmitter in a passive optical network. The transmitter comprising a processing unit, a memory unit, and at least one optical communication interface. The processing unit may be arranged to operate instruction sets stored in the memory unit for receiving burst control information, based on bit error ratio measurements, from an optical line termination, i.e. OLT, and transmitting communication burst in accordance with the burst control information.

Furthermore, the present invention may be seen as a system in a passive optical network, comprising a plurality of optical network units with each a transmitter as described above and an optical receiver in a passive optical network as described above.

Still another aspect of the present invention is provided, a computer program stored in a computer readable storage medium. The computer program arranged for controlling, in an optical line termination unit, communication bursts from a plurality of optical network units in a passive optical network. The computer program may comprise instruction sets for receiving communication data from the optical network units, determining bit error ratio of the received communication data, determining, using the bit error ratio, optimized transmission scheduling of communication burst from the optical network units, and providing a control signal to the optical network units indicating scheduling of transmission bursts from the optical network units in accordance with the optimized transmission scheduling.

The advantages of the present invention may be summarized as follows:
- It aids in finding an optimal overhead time or scheduling of bursts in a burst-mode optical system by using BER measurements, and thus makes it possible to maximize the capacity of the burst-mode link wile still meeting a target performance
- It does not require any special features from the physical layer devices (e.g. optical modules)
- Since a BER measurement is used to find the optimal overhead or scheduling, all the devices in the signal path from the ONU to the OLT (for example mid-span amplifiers) are accounted for.
- In a scenario when optical amplifiers are used for increasing the reach of the PON system, signal strength measurements may be complex or costly. By measuring BER instead of signal strength, this problem is avoided.
- Sometimes it may be useful at the OLT to get information about received signal strength at the OLT receiver. If the OLT receiver lacks this functionality, a BER measurement could implicitly help in giving this information.
- Not only the preamble, but also the guard time between bursts may be adjusted. Some receiver or amplifier architecture may benefit from an optimal guard time.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
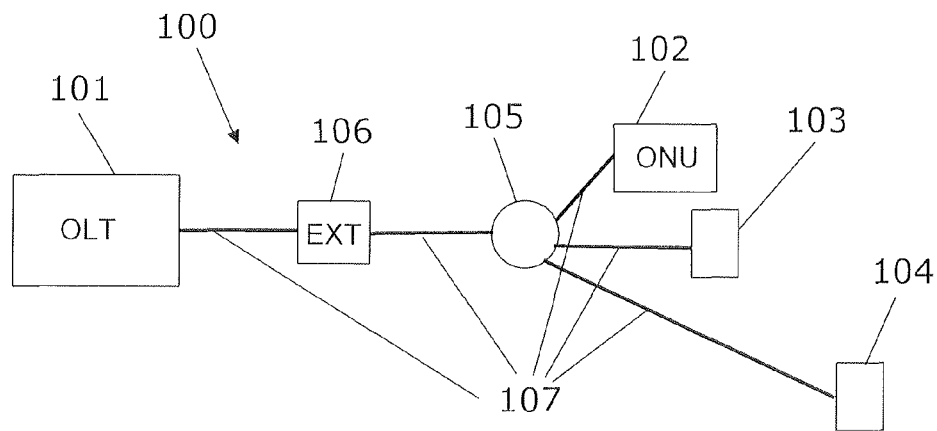
FIG. 1 illustrates schematically a network according to the present invention.

In FIG. 1 reference numeral 100 generally denote a passive optical network (PON) according to the present invention, with a plurality of optical network units (ONU) 102, 103, and 104 connected to an optical switch 105 and further in communication with a central office node, e.g. an optical Line termination (OLT) 101, via an optional communication reach extender 106. All units are connected with each other using optical fibers 107. The optical switch 105 may for instance be a passive optical splitter. The present invention is exemplified by three ONUs but it should be appreciated that less or more ONUs may be provided in the solution; e.g. two or more up to 64, 128, or even 256 ONUs depending on network complexity—the number of ONUs may be even further increased. The optional communication reach extender is a device that amplifies the optical signal. It can do so by either converting the optical signal to the electrical domain, amplify and optionally reshape and/or retime the electrical signal and convert the signal back to the optical domain, or amplify the signal in the optical domain directly before transmitting the optical signal further toward the final destination.

Transmissions from the ONUs are provided in bursts and scheduled in order to not be sent at the same time and thus affecting each other. The OLT provide the scheduling scheme and also provide transmissions parameters as will be discussed below in order to reduce the risk of transmission burst affecting each other.

The present invention makes use of bit error ratio (BER) measurements to find an optimal scheduling of transmission bursts, such as overhead length preceding each or certain burst transmissions in a PON system and to determine a suitable ordering scheme of transmission bursts. The invention applies to a system where the OLT may inform the ONT of how long overhead it should use. It is assumed that the OLT may send this information to the ONU.

Figure 2:
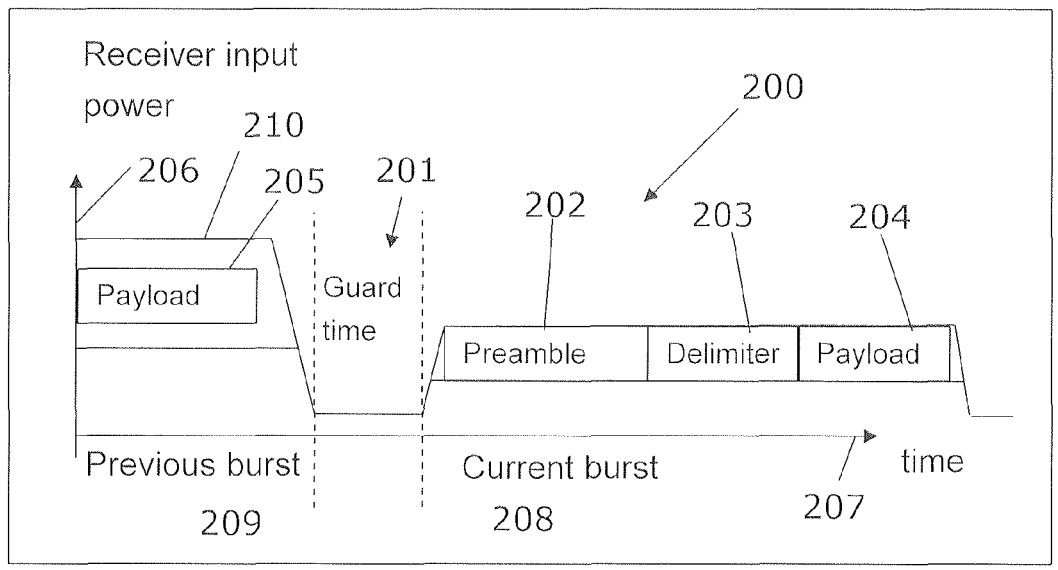
FIG. 2 illustrates schematically part of a burst train received at a receiving node according to the present invention.

In FIG. 2 a schematic of part of a typical transmission series 200 may be found. Each transmission burst 208 comprise a preamble 202, a delimiter 203, and a payload part 204; furthermore, between bursts a guard time 201 may be provided and may be seen as part of the burst. In FIG. 2, a previous burst 209 from some other ONU is indicated with the payload part 205. The maximum amplitude 210 of the transmission is indicated referenced to the y-axis 206 as received at the OLT, or received at any other device in the route of the transmissions. The x-axis 207 provides a time scale. In FIG. 2 it may also be seen that the receiver input power 210 varies between different bursts from different ONUs.

The optimal overhead length for the current burst is dependent on from which ONU the previous burst was transmitted. It is therefore possible to measure BER as a function of overhead length, such as the preamble length and/or guard time, for a combination of previous burst ONU—current burst ONU. One may for example start out with a short preamble and prolong the preamble until a target BER is met. This preamble would then be taken as the optimal preamble. Alternatively, one may start with a long preamble and shorten the preamble until a target BER is met.

In a system, one may for example start to find out if there are cases where the target BER is not met. One may then
a) try to reorder the transmissions from the ONUs in a way that minimizes BER and/or
b) adjust the overhead length.

Besides adapting the preamble length, the OLT may also adapt the guard time between bursts. Some receiver architectures may benefit from such a solution.

Additionally, the OLT may also use data about the geographical location of the ONUs collected during system startup, a procedure often referred to as ranging, and derive preamble lengths based on that information. When ONUs located far apart geographically needs to transmit after each other, a longer preamble may be used. The round trip time (RTT) of communication between the OLT and ONU is the main interest when taking the geographical location into account.

To take into account that timing parameters in the system might change on a short time scale, depending on such effects as which devices need to transmit, jitter, wander, Phase Looked Loop (PLL) drift, or other device or network dependent parameters, one may
a) vary only the part of the preamble that is used for deciding the optimal threshold and leave the preamble part that is used for the burst-mode Clock and Data Recovery (CDR) fixed or
b) regularly do new BER measurements to adapt to the changing conditions.

Figure 3:
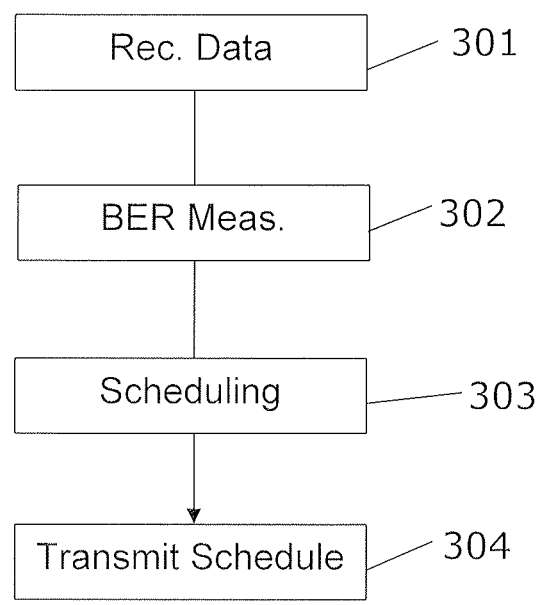
FIG. 3 illustrates schematically in a block diagram a method according to the present invention.

FIG. 3 shows an example of method according to the present invention. In a first step 301 data is received from an ONU and bit error ratio is measured 302 or determined. The OLT takes the BER data into consideration when scheduling 303 in accordance with the BER. Finally, appropriate scheduling parameters such as burst ordering and/or overhead length is transmitted 304 to each ONU.

The solution according to the present invention may be used during two situations:
1. During setup or reset of a network configuration, the OLT may measure the BER and during an iterative procedure determine suitable ordering and/or overhead lengths for each ONU using BER measurements.
2. During normal operation, since the conditions may change dynamically, the OLT may monitor the BER and perform optimization of ordering and/or overhead lengths dynamically. Changes of the conditions may change for instance if some ONUs stop communicating or reduce their communication rate.

The BER measurement may be done in several different ways. In one example embodiment, the BER is estimated by counting the number of bit errors in a clearly defined data field that is preceded or part of the by the preamble. In one example, the delimiter field which is used for byte or word synchronization may used. In another example, the frames on which forward error correction (FEC) is applied to could serve as the data field where bit errors are searched for. From the FEC decoder in the OLT, it may be possible to extract information about bit errors. Both these types of methods are possible to implement with a low complexity in the OLT.

The advantage of the invention is further highlighted with the following example. In a "long reach" PON scenario, the reach of the PON system is increased by the use of a reach extender 106. The reach extender amplifies the signals, by either electrical or optical means, in both directions. For some receiver architectures, the quick shift from a high to a low power in the upstream transmission when one ONU, e.g. ONU-3, is allowed to transmit may introduce a BER penalty at the OLT receiver. By preceding that burst with a longer overhead, the BER penalty may be avoided. This is traded off against a slight decrease in the upstream capacity caused by the prolonged overhead.

The overhead lengths may be pre configured into specific lengths, making it easy to implement by allowing the OLT to choose from a list of pre set overhead lengths, e.g. short, medium, and long overhead lengths; it should be noted that the present invention is not limited to three pre configured lengths but may comprise a number less or more than three pre configured overhead lengths, or the OLT may calculate a suitable length using the BER as a variable.

Figure 4:
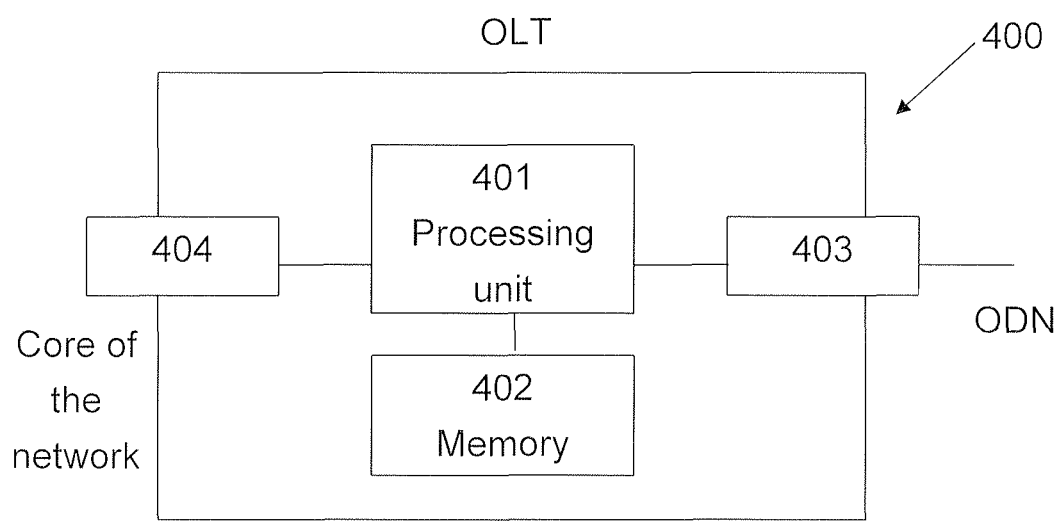
FIG. 4 illustrates schematically in a block diagram a device according to the present invention.

The OLT 101, 400 is shown in FIG. 4, comprising a processing unit 401, a memory unit 402, and at least one optical communication interface unit 403 that faces the ODN (or in other words the customer premises side). Furthermore, the OLT may optionally comprise at least one communication interface unit 404 that enables communication with the core of the network. The processing unit 401 is arranged to execute instruction sets stored in the memory unit 402. The instruction sets may also be stored in the processing unit itself, e.g. in case of the processing unit being a hardware programmed unit, for instance an Application Specific Integrated Circuit (ASIC) or Field Programmable Gate Array (FPGA). The processing unit may alternatively be a microprocessor, digital signal processor (DSP), or similar software handling processing unit reading computer program code from the memory being a computer program readable storage medium. The instruction sets may be distributed to the memory unit and/or processing unit using a network connection—optical or electrical network connection, or the instruction sets may be installed at production of the device or during maintenance of the device.

The instruction sets executed in the OLT are arranged to operate the method as previously described.

Figure 5:
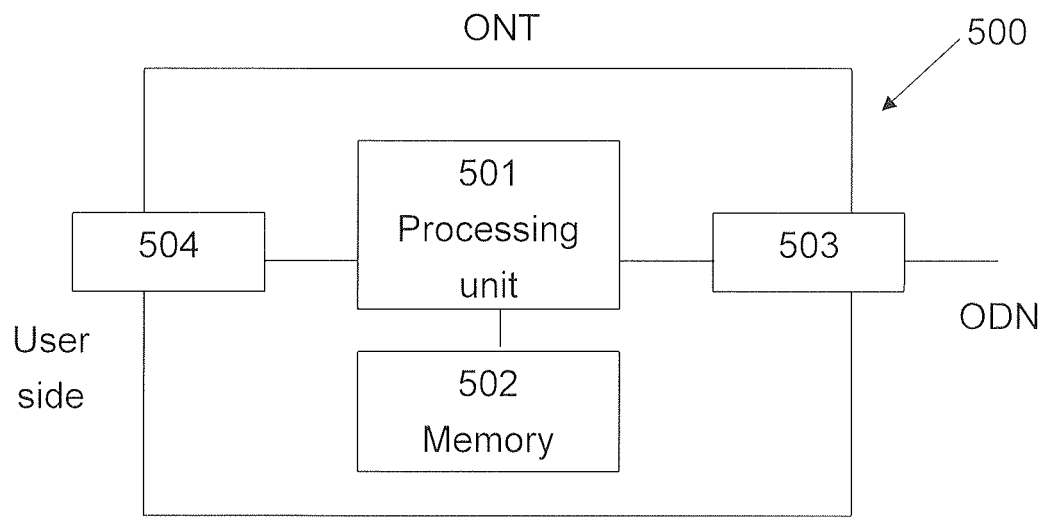
FIG. 5 illustrates schematically in a block diagram another device according to the present invention.

The ONU 500 as seen in FIG. 5 is arranged as a transmitter of information to the OLT and the ONU comprises a processing unit 501 arranged to execute instruction sets for receiving and using transmission burst control information based on the BER measurement from the OLT. The ONU further comprises a memory unit 502, and at least one optical communication interface 503 that enables communication with the optical distribution network (ODN), or in other words the OLT side, and optionally at least one communication interface 504 that is arranged to communicate with the user network side; it would typically connect to for instance end equipment such as computers, TV sets, telephones, switches, and routers at the customer premises.

It should be understood that other devices in the network configuration may perform similar task as exemplified with the OLT, e.g. the range extender 106, an optical switch 105, or even a for such purposes dedicated device may be equipped with similar BER analysis functionality and control the scheduling and/or overhead length management. However, advantageously the OLT is used since this device already comprise high level functionality for receiving and analyzing data and thus it will be cost efficient to add functionality for measuring BER and controlling scheduling of data bursts and overhead length management for ONUs in the OLT.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

ABBREVIATIONS

BER Bit Error Ratio
CDR Clock and Data Recovery
CO Central Office
DBA Dynamic Bandwidth Allocation
FEC Forward Error Correction
ODN Optical Distribution Network
O/E/O Electrical-Optical-Electrical
OLT Optical Line Termination
ONT Optical Network Termination
ONU Optical Network Unit
PON Passive Optical Network
TDMA Time Division Multiple Access

The invention claimed is:

1. An optical receiver for a passive optical network, comprising
   a processing unit;
   a memory unit;
   an optical communication interface;
   wherein the processing unit is arranged to execute instruction sets stored in the memory unit, to receive communication data on the optical communication interface from a plurality of optical network units and wherein the processing unit is further arranged to:
   determine a bit error ratio (BER) in received communication data; determine, using the BER, optimized transmission scheduling of communication bursts from the optical network units, which optimized transmission scheduling comprises adjusting overhead length of transmission burst, wherein the overhead length is adjusted by adjusting, using the BER, at least one of guard time and preamble length; and provide a signal to the optical network units indicating the transmission scheduling of transmission bursts in accordance with the determined optimized transmission scheduling.

2. The optical receiver according to claim 1, wherein the optimized transmission scheduling comprises adjusting transmission order of communication data from the optical network units.

3. The optical receiver according to claim 1, wherein the BER is determined by analyzing a pre defined data field transmitted from the optical network unit.

4. The optical receiver according to claim 1, wherein the BER is determined by analyzing frames related to forward error correction.

5. The optical receiver according to claim 1, wherein the processing unit is arranged to continuously execute scheduling optimization in order to accommodate changes of at least one of network configuration and network transmission quality.

6. The optical receiver according to claim 1, wherein the processing unit is further arranged to take geographical location of the optical network units into account when determining the optimized transmission scheduling.

7. A system for a passive optical network, comprising a plurality of optical network units and an optical receiver according to claim 1 and an optical transmitter which optical transmitter comprises a processing unit, a memory unit, and at least one optical communication interface, wherein the processing unit is arranged to operate instruction sets stored in the memory unit for receiving burst control information, based on bit error ratio measurements, from an optical line termination (OLT), and transmitting communication burst in accordance with the burst control information.

8. A method in an optical line termination device for a passive optical network for controlling transmission bursts from a plurality of optical network units comprising the steps of:
   receiving communication data from the optical network units;
   determining bit error ratio (BER) of the received communication data;

determining, using the bit error ratio, optimized transmission scheduling of communication burst from optical network units, which optimized transmission scheduling comprises adjusting overhead length of transmission burst, wherein the overhead length is adjusted by adjusting, using the BER, at least one of guard time and preamble length; and providing a control signal to the optical network units indicating scheduling parameters of transmission burst from the optical network units in accordance with the optimized transmission scheduling.

9. A computer program stored in a non-transitory computer readable storage medium, for controlling, in an optical line termination unit communication bursts from a plurality of optical network units for a passive optical network, the computer program comprising instruction sets for:

receiving communication data from the optical network units; determining bit error ratio (BER) of the received communication data; determining, using the bit error ratio, optimized transmission scheduling of communication burst from the optical network units, which optimized transmission scheduling comprises adjusting overhead length of transmission burst, and wherein the overhead length is adjusted by adjusting, using the BER, at least one of guard time and preamble length; and providing a control signal to the optical network units indicating scheduling of transmission burst from the optical network units in accordance with the optimized transmission scheduling.

* * * * *